United States Patent
Dötsch et al.

(10) Patent No.: US 11,824,287 B2
(45) Date of Patent: Nov. 21, 2023

(54) PRINTED CIRCUIT BOARD ASSEMBLY

(71) Applicant: Endress+Hauser SE+Co. KG, Maulburg (DE)

(72) Inventors: Michael Dötsch, Rickenbach (DE); Robert Schmidt, Schopfheim (DE); Ralf Leisinger, Wieslet (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 67 days.

(21) Appl. No.: 17/617,801

(22) PCT Filed: May 6, 2020

(86) PCT No.: PCT/EP2020/062527
§ 371 (c)(1),
(2) Date: Dec. 9, 2021

(87) PCT Pub. No.: WO2020/249321
PCT Pub. Date: Dec. 17, 2020

(65) Prior Publication Data
US 2022/0247103 A1    Aug. 4, 2022

(30) Foreign Application Priority Data

Jun. 13, 2019 (DE) ...................... 10 2019 116 154.1

(51) Int. Cl.
*H01R 12/00* (2006.01)
*H01R 12/51* (2011.01)
(Continued)

(52) U.S. Cl.
CPC ....... *H01R 12/515* (2013.01); *H01R 13/6683* (2013.01); *H01R 43/0256* (2013.01); *H01R 2201/20* (2013.01)

(58) Field of Classification Search
CPC .............. H01R 12/515; H01R 13/6683; H01R 13/0256; H01R 2201/20
See application file for complete search history.

(56) References Cited

U.S. PATENT DOCUMENTS

| 8,426,746 B2* | 4/2013 | Yamanaka ............. H05K 3/306 174/250 |
| 2009/0130866 A1* | 5/2009 | Huang ................. H01R 12/716 439/55 |

FOREIGN PATENT DOCUMENTS

| CN | 101507375 A | 8/2009 |
| CN | 101536269 A | 9/2009 |

(Continued)

*Primary Examiner* — Phuong Chi Thi Nguyen
(74) *Attorney, Agent, or Firm* — Mark A. Logan; Endress+Hauser (USA) Holding Inc.

(57) ABSTRACT

Disclosed is an apparatus for electrically contacting a control/evaluation electronics of a field device of automation technology with an external energy supply and/or a controller, wherein the control/evaluation electronics of the field device is arranged on a circuit card, wherein at least one terminal box is provided, in which a plurality of adjoining electrical connection terminals are provided, wherein the electrical connection terminals serve, in each case, for accommodating an electrical connecting element, wherein the electrical connecting elements are connected mechanically and electrically with the circuit card, in each case, via a solder pad, and wherein there are provided between each two solder pads vacancies in the circuit card, which are so embodied that the length of the leakage preventing distance between the solder pads satisfies a predetermined ignition protection type.

7 Claims, 3 Drawing Sheets

(51) Int. Cl.
*H01R 13/66* (2006.01)
*H01R 43/02* (2006.01)

(56) References Cited

FOREIGN PATENT DOCUMENTS

| | | | |
|---|---|---|---|
| CN | 108476599 | A | 8/2018 |
| DE | 1893582 | U | 5/1964 |
| DE | 4038362 | A1 | 6/1992 |
| DE | 19757938 | A1 | 7/1999 |
| DE | 202005017012 | U1 | 1/2006 |
| DE | 102006052211 | A1 | 5/2008 |
| DE | 102010040866 | A1 | 3/2012 |
| DE | 102016106900 | A1 | 10/2017 |
| DE | 102017115259 | A1 | 1/2019 |
| EP | 2893299 | A1 | 7/2015 |
| JP | 2017084553 | A | 5/2017 |
| TW | 200923620 | A | 6/2009 |

* cited by examiner

PRINTED CIRCUIT BOARD ASSEMBLY

CROSS-REFERENCE TO RELATED APPLICATIONS

The present application is related to and claims the priority benefit of German Patent Application No. 10 2019 116 154.1, filed on Jun. 13, 2019 and International Patent Application No. PCT/EP2020/062527, filed on May 6, 2020, the entire contents of which are incorporated herein by reference.

TECHNICAL FIELD

The invention relates to an apparatus for electrically contacting a control/evaluation electronics of a field device of automation technology with an external energy supply and/or a controller.

BACKGROUND

In process automation as well as in manufacturing automation, field devices are often applied for registering and/or influencing physical, chemical or biological process variables. Serving for registering the variables are measuring devices. Such are used, for example, for pressure- and temperature measurement, conductivity measurement, flow measurement, pH measurement, fill level measurement, etc. and register the corresponding variables, pressure, temperature, conductivity, pH value, fill level, flow, etc. Used for influencing the variables are actuator systems. Examples of actuators are pumps or valves, which can influence the flow of a liquid in a tube or pipe or the fill level in a container. Besides the above mentioned measuring devices and actuators, referred to as field devices are also remote I/Os, radio adapters, and, in general, devices, which are arranged at the field level. Referred to as field devices are, generally, devices, which are applied in the vicinity of a process- or plant and which deliver, or process, process- or plant relevant information.

In order to be able to apply field devices of automation technology also in gas explosion endangered areas, the electrical components of the field devices must be designed to meet a suitable Ex-ignition protection type, e.g. the ignition protection type, "increased safety Ex e". Subgroups of this standard hold for defined electrical components. For example, the standard Ex-ec (DIN EN 60079-7) is for connections, conductors, windings, lamps and batteries including semiconductor- or electrolytic capacitors. Thus, it is established in this standard, among other things, how large the separation between the connection terminals of the control/evaluation electronics of a field device arranged on a circuit card must be, when the field device is connected to a grid voltage of 230V AC. Upon maintaining the separation prescribed in the standard, it is assured that no leakage currents flow between the connection terminals, whereby a short circuit with spark formation is prevented. Upon maintaining the required leakage preventing distance, thus, a danger of explosion is excluded in gas explosion endangered areas.

SUMMARY

An object of the invention is to provide an apparatus for electrically contacting a control/evaluation electronics of a field device of automation technology with an external energy supply and/or a controller, which apparatus is usable in explosion endangered areas.

The object is achieved by an apparatus for electrically contacting a control/evaluation electronics of a field device of automation technology with an external energy supply and/or a controller, wherein the control/evaluation electronics of the field device is arranged on a circuit card, wherein at least one terminal box is provided, in which a plurality of adjoining electrical connection terminals are provided, wherein the electrical connection terminals serve, in each case, for accommodating an electrical connecting element, wherein the electrical connecting elements are connected mechanically and electrically with the circuit card, in each case, via a solder pad, and wherein, in each case, there are provided between two solder pads vacancies in the circuit card, which are so embodied that the length of the leakage preventing distance between the solder pads satisfies a predetermined ignition protection type. A simply manufactured embodiment of the solution of the invention provides that the vacancies are slots, which are milled into the circuit card.

By the invention as well as by the above described embodiment, there are formed on the direct connecting line between two connection terminals—thus, between two neighboring solder pads of the connection terminals, which are arranged on the circuit card—besides the leakage preventing distance on the circuit card also an air path. Since air has a higher value of resistance than the circuit card, the leakage preventing distance is lengthened as a result of the intermediately lying air path. The same holds naturally also for lengthening the leakage preventing distance on the circuit card, since such leads around the vacancies, or slots. Depending on the breadth of the air path, or breadth and length of the vacancies, a predetermined ignition protection type can be implemented with the invention, without requiring that the separation between two connection terminals be enlarged. This has the advantage that the dimensioning can, firstly, be kept small—this helping the further miniaturization of circuit cards—and, equally, standard components, in this case, e.g. one- and the same plug, can be utilized for a plurality of Ex protection variants of a field device.

In an advantageous embodiment of the apparatus of the invention, an elongated component having two mutually opposite surfaces is provided wherein on one of the two surfaces of the elongated component teeth are provided, which are so arranged and embodied that they engage in or are introducible into corresponding vacancies of the circuit card. The elongated component is formed of a non-conductive material. Preferably, this embodiment is used, when the circuit card with the connection terminals is oriented essentially perpendicularly to the floor of a field device housing and the circuit card is filled to the height of the solder pad or the connection terminals with a matrix of non-conductive material. Usually, a suitable matrix has a leakage current resistance—characterized by the Comparative Tracking Index CTI—of preferably greater than 500. Also the material, of which the elongated component is formed, has a comparable value.

The leakage current resistance characterizes the insulating strength of the surface (leakage preventing distance) of insulation materials. It defines the maximum leakage current, which can arise under standard test conditions in a defined test setup. While usual circuit card materials have a CTI of under 250, e.g. 125, plastics used as matrices (e.g. potting compounds), such as polyethylene, polyester resin, PTFE or PBT, have a CTI of preferably 500-600. The higher the CTI of the utilized materials, or material, the smaller the separation between two electronic components can be, in this case, the connection terminals, for satisfying a predetermined ignition protection type.

If the field device housing is filled with matrix/potting compound to the height of the vacancies/slots of the circuit card arranged perpendicularly in the field device housing, then there is the danger that the high leakage current resistance achieved by the vacancies as a result of the leakage preventing distance through air will be reduced. Such is the case, when material of the matrix penetrates into the vacancies/slots. The reason is the lower leakage current resistance of the matrix compared with leakage current resistance of the air.

The presence of matrix within the vacancies in the case of potting the circuit card is quite probable. Thus, the metered amount of matrix and the dimensioning of the inner space of the field device housing to be filled with matrix are subject to certain fluctuations. Since, further, all electrical connections/solder pads and electrical components of the circuit card should always be protected by a matrix of potting compound, the metered amount must lie at an ascertained upper limit. Due to manufacturing- and metering errors, it cannot be excluded that the matrix more or less fills the vacancies, whereby the leakage current resistance formerly achieved for satisfying the predetermined ignition protection type is decreased.

With the insertion of the elongated component, this unacceptable drawback can be removed, since the direct leakage preventing distance between two neighboring solder pads is lengthened by the teeth protruding out from the vacancies/slots. Of course, the length of the teeth is so selected that the teeth fit as accurately as possible in the vacancies.

An additional development provides that on the surface of the elongated component bearing the teeth, at least one stop structure is provided for resting against the circuit card. The stop structure is so embodied that the surface of the elongated component, which bears the teeth, has a defined separation from the facing surface of the circuit card. Furthermore, the height of the teeth is so dimensioned that the teeth extend out from the vacancies by a defined amount over the circuit card upper surface. The leakage preventing distance between two neighboring solder pads of the connection terminals extends, thus, from a solder pad over the circuit card, the possibly present matrix in the vacancy, the tooth of the elongated component protruding out from the circuit card, the possibly present matrix in the vacancy and the circuit card to the neighboring solder pad. By appropriately adapted height of the teeth, the required leakage preventing distance for satisfying the desired ignition protection type can be implemented. The height of the teeth protruding out from the circuit card is so dimensioned that the required leakage preventing distance for implementing the desired ignition protection type is present.

Alternatively or in addition to the above mentioned embodiment of the apparatus of the invention, at least one of the teeth is embodied in a region adjoining the surface of the elongated component as a stop structure for the circuit card, such that the surface of the elongated component, which bears the teeth, has a defined separation from the facing surface of the circuit card. Whether one or more stop structures are provided depends on the longitudinal extent of the elongated element and, thus, on the number of connection terminals.

An advantageous embodiment of the apparatus of the invention provides that two teeth arranged in the end regions of the elongated component are embodied, in each case, in the tooth region, which protrudes inwardly into the corresponding cavity, as detents, especially as snap connectors, in such a manner that the elongated component can be secured, preferably releasably, to the circuit card.

According to the invention, the breadth and length of the vacancies is so designed that the leakage preventing distance on the circuit card around each vacancy is sufficient for satisfying the predetermined ignition protection type. Moreover, it is provided that the height of the teeth is so designed that the leakage preventing distance along the teeth is sufficient for satisfying the predetermined ignition protection type. The height of the teeth is especially so designed that, in the case of a material—e.g. matrix in the form of potting compound—in the vacancies, the leakage preventing distance along the teeth is sufficient for satisfying the predetermined ignition protection type. The presence of matrix in the vacancies filled in the normal case with air is still possible when the circuit card is located in a field device housing and is potted there with matrix in the upwards position—thus, essentially perpendicularly to the floor of the field device housing—. The reasons for this were already discussed above.

To be mentioned remains that the elongated component with teeth, snaps and stop structures is formed of a non-conductive, flexible material, preferably a plastic.

Preferably, the ignition protection type to be achieved is the ignition protection type Ex ec—increased safety. This enables that the field devices can be used in a gas explosion endangered surroundings, since it is assured that upon supply of energy or in the case of failure, no short circuiting can occur between the connection terminals.

BRIEF DESCRIPTION OF THE DRAWINGS

The invention will now be explained in greater detail based on the appended drawing, the figures of which show as follows.

DETAILED DESCRIPTION

Figure 1:
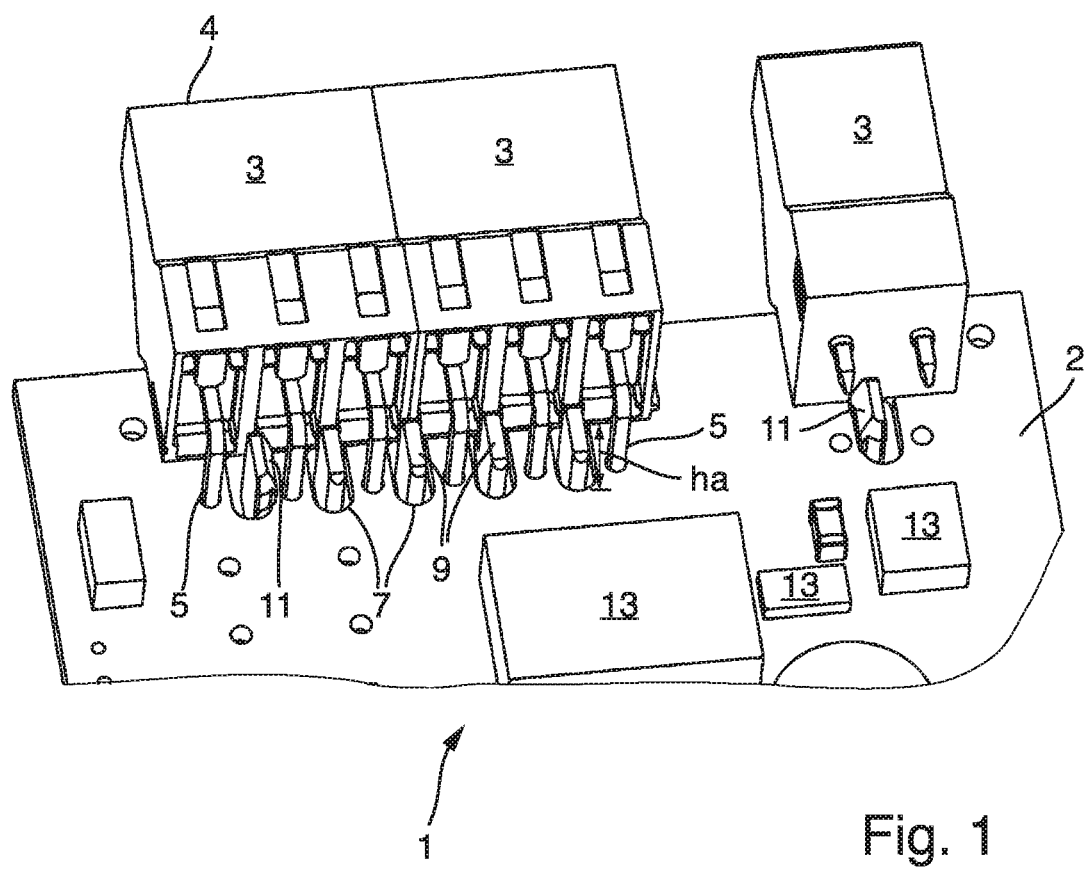
FIG. 1 shows a perspective view of the top of a circuit card with an embodiment of the apparatus of the present disclosure.
Figure 2:
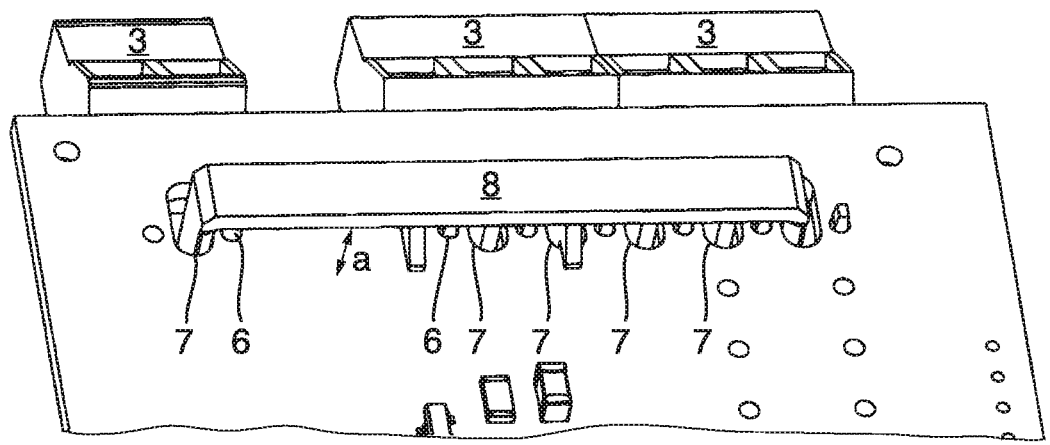
FIG. 2 shows a perspective, partial view of the bottom part of the circuit card shown in FIG. 1.
Figure 3:
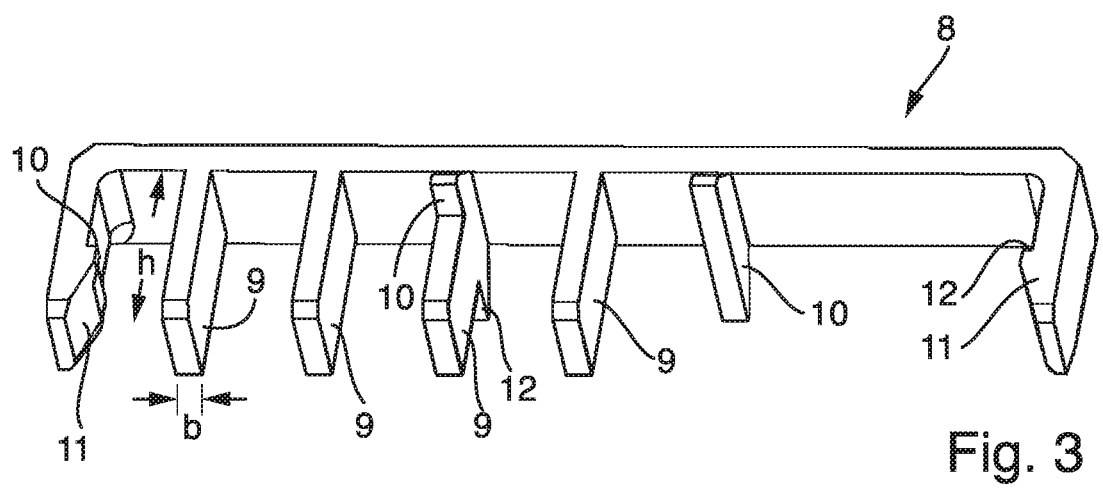
FIG. 3 shows a perspective view of an elongated component suitable for the solution of the present disclosure.

FIG. 1 shows a perspective view of the top of a circuit card 2 with an embodiment of the apparatus of the invention for electrically contacting a control/evaluation electronics 1 of a field device (not shown) of automation technology having an external energy supply and/or a controller (not shown). FIG. 2 shows a perspective, partial view of the bottom part of the circuit card 2. Arranged on the circuit card 2, by way of example, are a plurality of electrical components 13, whose details are, however, not of concern in connection with the invention. FIG. 3 shows a perspective view of an elongated component, such as can be utilized in the case of the embodiment shown in FIGS. 1 and 2.

The control/evaluation electronics 1 of the field device is arranged on a circuit card 2. For connection to an energy supply and/or a controller, a multipart terminal box 3 is provided, in which a plurality of adjoining electrical connection terminals 4 are provided. Each electrical connection terminal 4 has an electrical connecting element 5. The electrical connecting elements 5 are, in each case, connected via a solder pad, that is, an electrical connection, mechanically and electrically with the circuit card 2. Between each two adjoining or neighboring solder pads 6, vacancies 7 are provided in the circuit card 2. Preferably, the vacancies 7 are embodied as slots, which are milled into the circuit card 2. The vacancies 7, or slots, are so dimensioned that the length of the leakage preventing distance between two neighboring solder pads 6 satisfies a predetermined ignition protection type.

In order with the above described circuit card 2 to be able to implement an even higher ignition protection type, an elongated component 8 is provided. The elongated component 8 has two mutually opposite surfaces, wherein on one of the two surfaces of the elongated component 8 a plurality of vertically directed teeth 9 are provided. Such are so arranged and embodied that they engage with, or are introducible into, corresponding vacancies 7 of the circuit card 2. Preferably, the elongated component 8 is connectable releasably with the circuit card 2. Especially, the elongated component 8 includes, for this, in its end regions, in each case, a tooth formed as a flexible snap connector 11, which passes through a corresponding vacancy 7 and catches on the surface of the circuit card 2. The length of the vacancies 7 fits accurately with the length of the cross section of the teeth 9, while the breadth of the cross section of the teeth 9 is less than the breadth of the vacancies 7.

In order to assure that the teeth 9 in the mounted state protrude with a defined height above the circuit card 2, there is provided besides the bearing surfaces 12 on the snap connectors 11 at least one stop structure 10 with a bearing surface 12. Additionally or alternatively, moreover, also at least one of the teeth 9 can be so embodied that it has a stop structure 10. The bearing surfaces 12 of the snap connectors 11 and the bearing surface 12 of the stop structure(s) 10 lie in the case of mounted elongated component 8 against the two opposite surfaces of the circuit card 2. The elongated component 8 is secured via these opposing bearing surfaces 12 tightly against the circuit card 2.

The surface of the elongated component 8, which bears the teeth 9, is spaced a defined distance from the opposing surface of the circuit card 2. As a result, it is also assured that the teeth 9 protrude out from the circuit card 2 with a defined height ha.

The breadth b and the length 1 of the vacancies 7 is so designed according to the invention that the leakage preventing distance on the circuit card 2 around each tooth 9 is sufficient to satisfy the predetermined ignition protection type.

Figure 4:
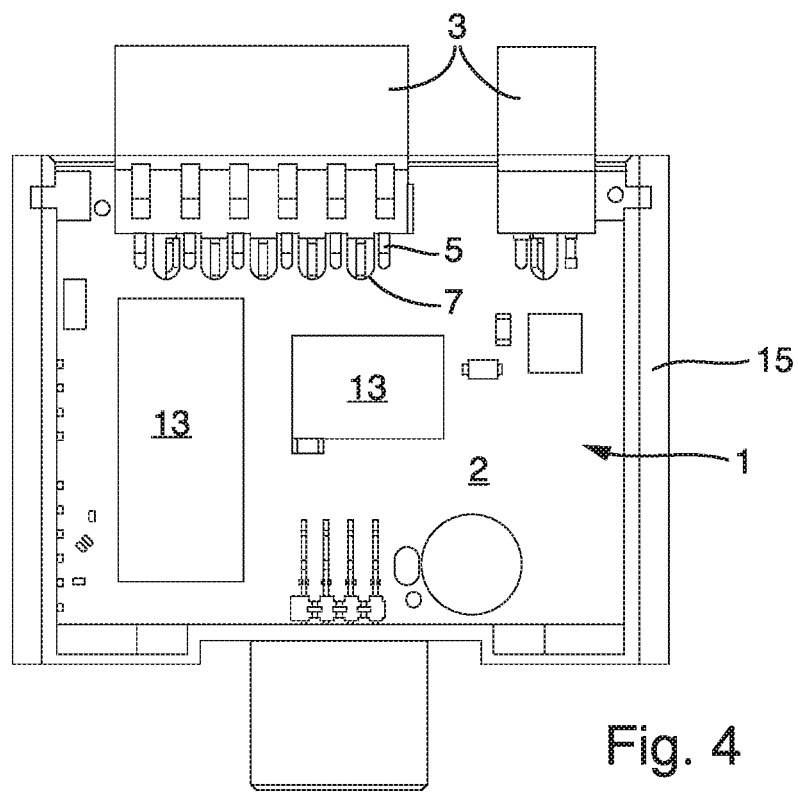
FIG. 4 shows a longitudinal section of a field device housing containing a circuit card.
Figure 5:
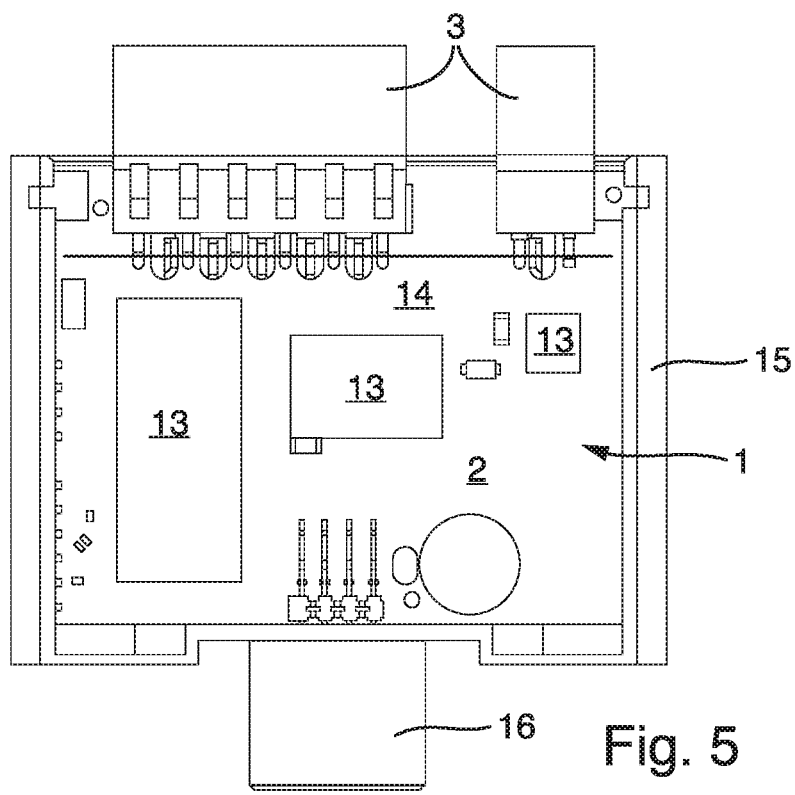
FIG. 5 shows a longitudinal section of the field device housing shown in FIG. 4 with potted circuit card.

FIG. 4 shows a longitudinal section of a field device housing 15 with vertically integrated circuit card 2. FIG. 5 shows the field device housing 15 filled with a potting compound matrix 14 to the solid line. As already mentioned, at least one stop structure 10 for bearing against the circuit card 2 is provided on the surface of the elongated component 8, on which the teeth 9 are arranged. The stop structure 10 is so embodied that the surface of the elongated component 8, which has the teeth 9, has a defined separation from the opposing surface of the circuit card 2. Furthermore, the height h of the teeth 9 is so dimensioned that in the mounted state they protrude a defined height ha beyond the opposite surface of the circuit card 2. The leakage preventing distance between two neighboring solder pads 6 of the connection terminals 3 extends, thus, from a solder pad 6 over the circuit card 2, the corresponding matrix 14 in the vacancy 7 to the tooth 9, the region of the tooth 9 protruding out from the circuit card 2, the corresponding matrix 14 in the vacancy 7 and the circuit card 2 to the neighboring solder pad 6. Because of the above described embodiment of the elongated component 8, the height ha of the teeth 9 protruding out from the circuit card 2 can be so designed that the desired ignition protection type is implemented.

Preferably, the ignition protection type to be implemented is the ignition protection type Ex ec—increased safety. This enables that the field devices can be used in a gas explosion endangered environment, since it is assured that no short circuiting can occur between the connection terminals 4.

The invention claimed is:

1. A printed circuit board assembly, comprising:
    a printed circuit board (PCB), including:
        a control/evaluation electronics of a process automation field device;
        at least two solder pads; and
        at least two recesses in the PCB, wherein the at least two recesses are slots milled through the PCB and are disposed between the at least two solder pads, wherein each of the at least two recesses are embodied such that a length of a leakage-preventing distance between the at least two solder pads satisfies a predetermined ignition protection type;
    an elongated component having a first surface having at least two teeth and at least one stop structure, wherein each tooth is arranged on the elongated component and is embodied to engage in or to be introducible into a corresponding recess in the PCB and the at least one stop structure is embodied to rest against the PCB such that the first surface of the elongated component has a defined separation from the PCB; and
    a terminal box having at least two adjoining electrical connection terminals, wherein the at least two electrical connection terminals are mechanically and electrically connected to the at least two solder pads, wherein each electrical connection terminal accommodates an electrical connecting element of an external energy supply and/or an external controller, thereby enabling a connection between the external energy supply and/or the external controller and the control/evaluation electronics.

2. The printed circuit board assembly of claim 1, wherein the at least two teeth are each embodied as snap connectors that protrude into a corresponding slot such that the elongated component is releasably secured to the PCB.

3. The printed circuit board assembly of claim 1, wherein a breadth of each of the at least two recesses and a breadth of each of the at least two teeth is so designed that the leakage preventing distance on the PCB around, in each case, a respective slot or a tooth is sufficient for satisfying the predetermined ignition protection type.

4. The printed circuit board assembly of claim 1, wherein a height of each of the at least two teeth is so designed that the leakage preventing distance along the respective tooth is sufficient for satisfying the predetermined ignition protection type.

5. The printed circuit board assembly of claim 1, wherein the elongated component with at least two teeth and the at least one stop structure is formed of a non-conductive, flexible material.

6. The printed circuit board assembly of claim 1, wherein the predetermined ignition protection type is increased safety "e" according to DIN EN 60079-7.

7. A printed circuit board assembly, comprising:
a printed circuit board (PCB), including:
- a control/evaluation electronics of a process automation field device;
- at least two solder pads; and
- at least two recesses in the PCB, wherein the at least two recesses are slots milled through the PCB and are disposed between the at least two solder pads, wherein each of the at least two recesses are embodied such that a length of a leakage-preventing distance between the at least two solder pads satisfies a predetermined ignition protection type;

an elongated component having a first surface having at least two teeth, wherein each tooth is arranged on the elongated component and is embodied to engage in or to be introducible into a corresponding recess in the PCB, and wherein at least one of the at least two teeth includes, in a region adjoining the first surface of the elongated component, a stop structure embodied to rest against the PCB such that the first surface of the elongated component has a defined separation from the PCB; and a terminal box having at least two adjoining electrical connection terminals, wherein the at least two electrical connection terminals are mechanically and electrically connected to the at least two solder pads, wherein each electrical connection terminal accommodates an electrical connecting element of an external energy supply and/or an external controller, thereby enabling a connection between the external energy supply and/or the external controller and the control/evaluation electronics.

\* \* \* \* \*